W. J. HULL.
BAND SAW GUIDE.
APPLICATION FILED JAN. 30, 1911.
999,500.
Patented Aug. 1, 1911.
2 SHEETS—SHEET 1.
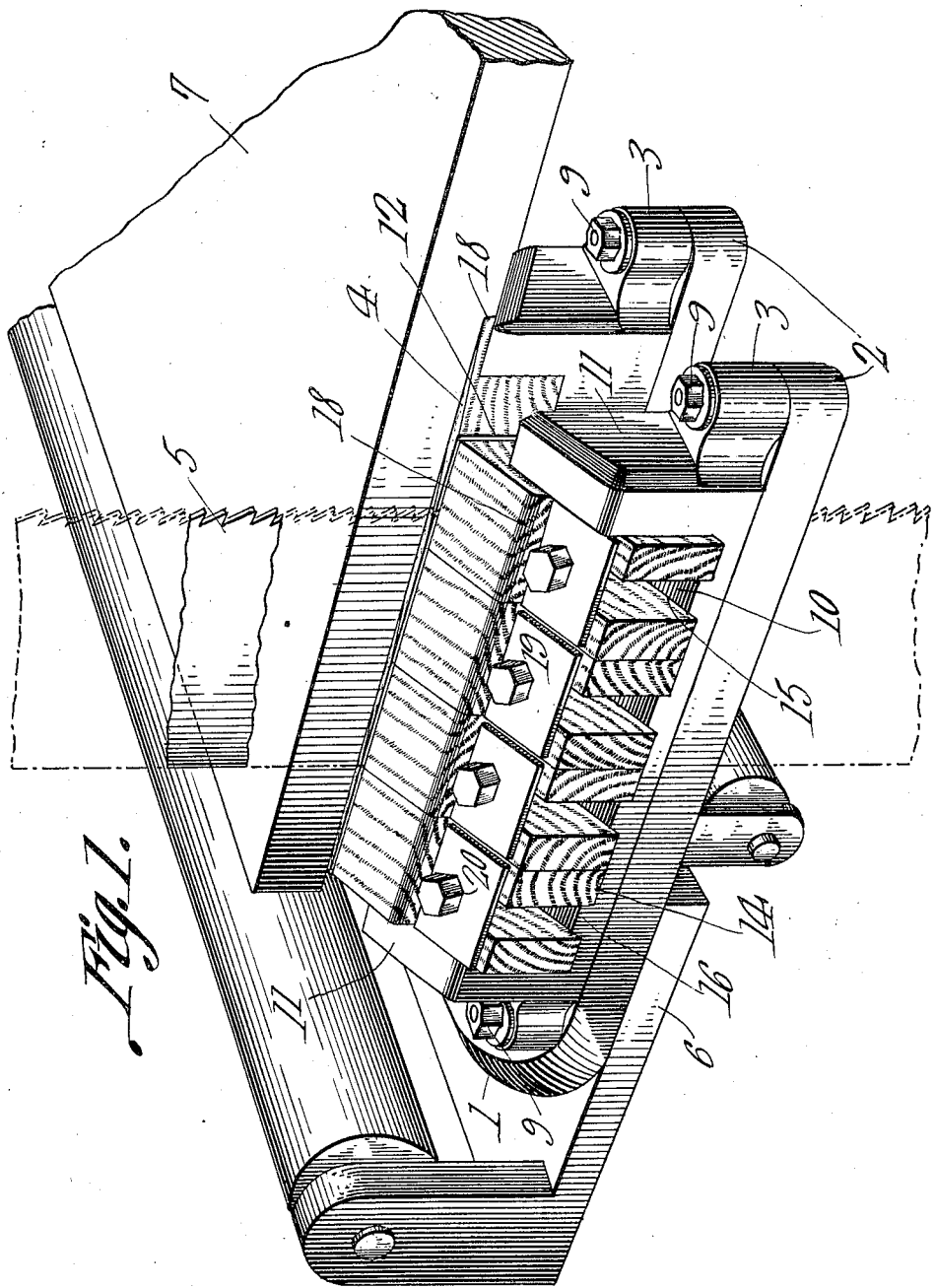
Witnesses
William J. Hull,
Inventor
by C. A. Snow & Co.
Attorneys

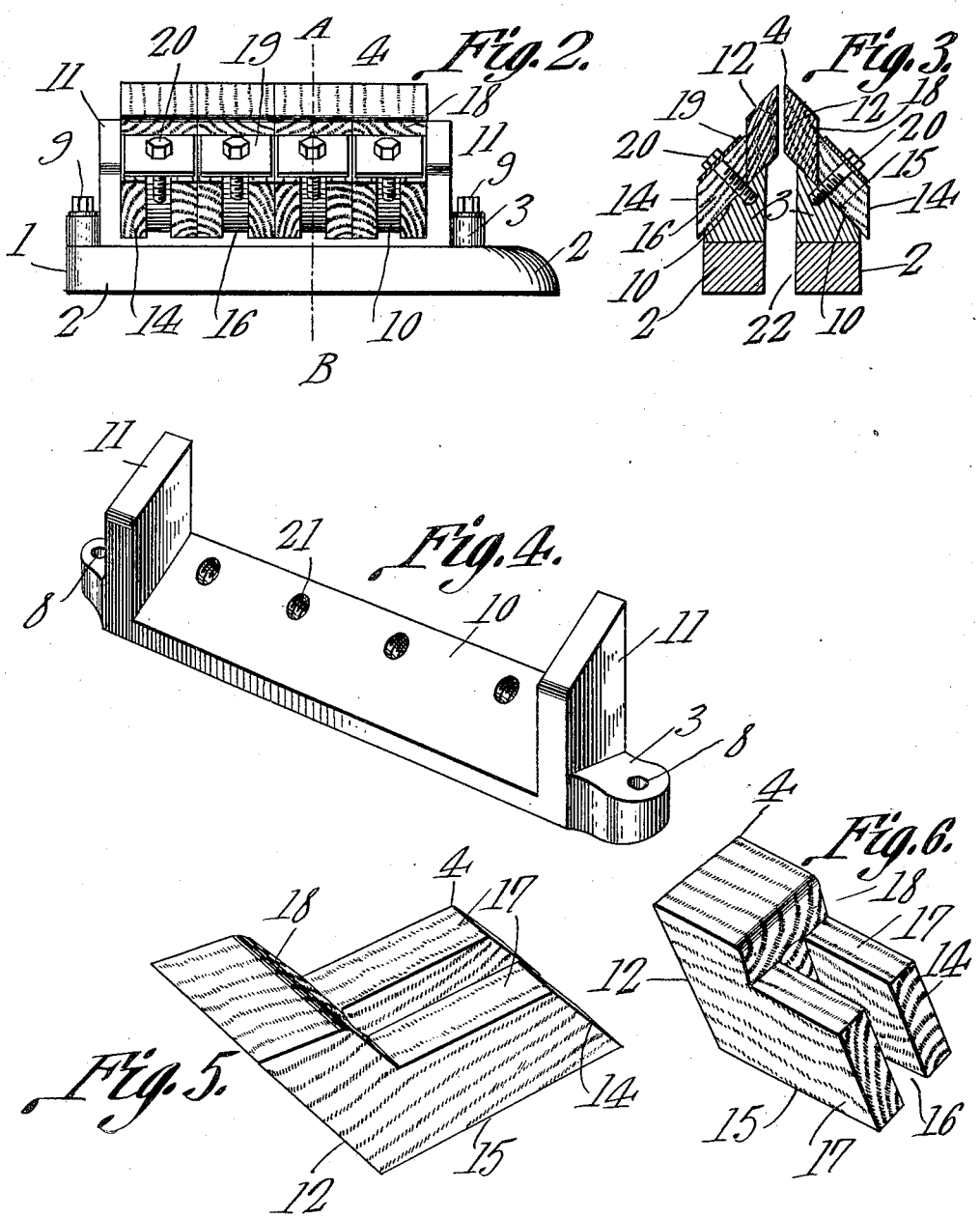

UNITED STATES PATENT OFFICE.

WILLIAM JOSEPH HULL, OF PATTERSON, LOUISIANA, ASSIGNOR OF ONE-EIGHTH TO WALTER C. MALOZ, ONE-EIGHTH TO DAVID H. MALOZ, AND ONE-FOURTH TO HERNDON J. WILLIAMS, ALL OF PATTERSON, LOUISIANA.

BAND-SAW GUIDE.

999,500.     Specification of Letters Patent.     Patented Aug. 1, 1911.

Application filed January 30, 1911. Serial No. 605,492.

*To all whom it may concern:*

Be it known that I, WILLIAM J. HULL, a citizen of the United States, residing at Patterson, in the parish of St. Mary and State of Louisiana, have invented a new and useful Band-Saw Guide, of which the following is a specification.

This invention aims to provide a guide for a band saw, so constructed that the guide blocks will wear evenly, and without heating or hardening the saw.

Another object of the invention is to provide a guide for band saws which will not clog or foul.

Another object of the invention is to provide novel means for assembling the constituent elements of the guide, and for adjusting the bearing blocks, and for holding them in adjusted positions.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing, Figure 1 shows the invention in perspective; Fig. 2 is a side elevation; Fig. 3 is a transverse section on the line A—B of Fig. 1; Fig. 4 is a perspective of one of the brackets; and Figs. 5 and 6 are perspectives of one of the bearing blocks, showing the said blocks in different positions.

The supporting structure upon which the saw engaging elements are mounted, comprises an arched, U-shaped base 1, to the arms 2 of which, brackets 3 are secured, the brackets carrying adjustable bearing blocks 4, movable transversely of the arms 2 of the base 1, and adapted to engage opposite sides of the saw 5.

The manner in which the invention is applied in practice, will vary with the construction of the band saw machine to which the invention is secured, and according to the taste of the user. Ordinarily, the band saw is supported at spaced points by the device herein disclosed. In Fig. 1, one of the guides is shown in operative relation to the band saw 5, the numeral 6 denoting a portion of the frame of the band saw, and the numeral 7 denoting the table, the band saw guide constituting the subject matter of the present invention being spaced slightly below the table 7. It is to be understood, however, that Fig. 1 illustrates merely one of the ways in which the invention may be mounted, in order to hold the band saw properly positioned with respect to the work in hand.

Passing now to a detailed description of the parts of the device, and noting in the first instance, Fig. 4, it will be seen that in the extremities of the brackets 3, there are openings 8, adapted to receive securing members 9, whereby the brackets may be held upon the arms 2 of the base 1. The upper faces of the brackets 3 are inclined downwardly and outwardly, as shown at 10, and at the ends of these inclined faces 10, there are upright standards 11. Between these standards 11, the bearing blocks 4 fit closely, the bearing blocks, however, being slidable upon the inclined faces 10 of the brackets, transversely of the brackets. The end faces 12 and 14 of the bearing blocks 4 are parallel, these faces being acutely disposed with respect to the longer axis of each bearing block 4. The bearing blocks 4 are fashioned from wood, preferably, the grain of the wood running approximately parallel to the longer dimension of the bearing blocks, the face 12 of each bearing block, which engages the saw 5, being acutely disposed with respect to the grain of the bearing block, so that the grain of the bearing block is presented diagonally to the saw 5. Owing to this disposition of the grain of the wood in the bearing blocks 4, the bearing blocks will wear away but slowly, the life of the bearing blocks being thereby prolonged. The blocks will not heat the saw, the saw being thereby prevented from hardening and cracking.

The bearing blocks 4 are provided with inclined lower faces 15, adapted to engage the faces 10 of the brackets 3. At their outer ends, the bearing blocks 4 are notched, as shown at 16, to define arms 17. In their upper faces, the bearing blocks 4 are provided with upstanding shoulders 18, against which abut the securing plates 19, securing members 20 being extended through the plates 19, between the arms 17, and into engagement with the brackets 3, as Fig. 3 will most clearly show, there being openings 21 in the faces 10 of the brackets 3, into which openings, the elements 20 extend.

By loosening the securing members 20, the bearing blocks 4 may be advanced and retracted transversely upon the brackets 3, so that the bearing blocks engage properly with the opposite faces of the saw 5, and when the members 20 are rotated to a firm seat, the plates 19 will be bound upon the upper faces of the bearing blocks 4, thus holding the bearing blocks against movement. Movement of the bearing blocks 4 is further prevented, positively, by reason of the fact that the plates 19 abut against the shoulders 18 in the bearing blocks 4. Owing to the fact that the bearing blocks 4 fit closely against each other, the terminal bearing blocks of the series bearing against the standards 10, rotation of the bearing blocks upon the securing members 20, will be impossible. Referring to Fig. 3, and noting the point at which the numeral 22 is applied, it will be seen that the inner, adjacent extremities of the bearing blocks 4 overhang the adjacent faces of the brackets 3, the brackets, therefore, being spaced apart, below the bearing blocks 4, so that there will be no chance for sawdust and other material to accumulate and clog, beneath the bearing blocks.

The bearing blocks 4, when constructed and positioned as above described, will wear evenly from top to bottom, and there will be no opportunity for slivers and the like to lodge between the saw 5 and the bearing blocks 4.

It will of course be understood that any number of bearing blocks may be provided, the device being constructed to accommodate any widths of saws.

What is claimed is:

In a device of the class described, a bracket provided adjacent its ends with spaced, upright standards, the upper face of the bracket being inclined between the standards, and having spaced openings therein; bearing blocks, between the standards, and in engagement with each other, and with the standards, the bearing blocks having shoulders upon their upper faces, and having longitudinal openings alined with the openings in the bracket; a plate resting upon each block, and abutting against the shoulder of each block; and securing devices extended through the plates, and through the openings in the blocks, into engagement with the openings in the standard; each plate being individually removable, to provide for the removal of each block, and the plates coöperating with the shoulders, to maintain the saw-engaging faces of the blocks alined.

In testimony that I claim the foregoing as my own, I have hereto affixed my signature in the presence of two witnesses.

WILLIAM JOSEPH HULL.

Witnesses:
J. F. TERRELL, Jr.,
F. W. BATTARBEE.

---

Copies of this patent may be obtained for five cents each, by addressing the "Commissioner of Patents, Washington, D. C."